United States Patent [19]
Trutna, Jr. et al.

[11] Patent Number: 5,534,702
[45] Date of Patent: Jul. 9, 1996

[54] RESOLUTION IMPROVEMENT OF IMAGES RECORDED USING STORAGE PHOSPHORS

[75] Inventors: William R. Trutna, Jr., Atherton; James B. Williamson, Sunnyvale, both of Calif.

[73] Assignee: Hewlett-Packard Company, Palo Alto, Calif.

[21] Appl. No.: 287,433

[22] Filed: Aug. 8, 1994

[51] Int. Cl.$^6$ .................................................. G03C 1/00
[52] U.S. Cl. ...................... 250/484.4; 250/486.1
[58] Field of Search .......................... 250/484.4, 486.1, 250/581, 526; 430/139

[56] References Cited

U.S. PATENT DOCUMENTS

| | | |
|---|---|---|
| 2,482,813 | 9/1949 | Urbach . |
| 4,752,557 | 6/1988 | Tsuchino et al. ............... 250/484.4 X |
| 4,944,026 | 7/1990 | Arakawa et al. ................. 250/484.4 |
| 5,006,366 | 4/1991 | Lindmayer . |
| 5,065,023 | 11/1991 | Lindmayer ................. 250/486.1 X |
| 5,208,459 | 5/1993 | Morrone et al. ............... 250/484.4 X |
| 5,245,623 | 9/1993 | McFarlane ....................... 372/75 |

FOREIGN PATENT DOCUMENTS

| | | |
|---|---|---|
| 233497 | 8/1987 | European Pat. Off. ............ 250/484.4 |
| 62-36599 | 2/1987 | Japan ............................ 250/486.1 |
| 2-129600 | 5/1990 | Japan ............................ 250/484.4 |
| 9012405 | 10/1990 | WIPO .............................. 250/484.4 |

OTHER PUBLICATIONS

Brian O'Brien, "Preparation and Characterestics of Solid Luminiscent Materials", John Wiley & Sons (1948), pp. 114–147, 278–301, 326–337 and 358–371.

*Primary Examiner*—Carolyn E. Fields
*Assistant Examiner*—Edward J. Glick

[57] ABSTRACT

A simplified, cost effective optical apparatus for solid state photorecording of optical images with enhanced resolution. The optical apparatus of the invention includes an array of optical apertures and a plurality of portions of a phosphorescent material. Each portion is optically coupled to a respective one of the apertures. The apertures are exposed to an optical image so as to record the image in the plurality of portions of the phosphorescent material. A number of the apertures of the invention is large, preferably within a range of approximately one million to seven million apertures. For example in a preferred embodiment the number of the apertures is approximately six million apertures. Preferably, the optical apertures are microscopic optical apertures. For example, each aperture has a respective width dimension within a range of approximately ten to fifty microns. Preferably, the respective width dimension of each aperture is approximately twelve microns.

19 Claims, 5 Drawing Sheets

RESOLUTION IMPROVEMENT OF IMAGES RECORDED USING STORAGE PHOSPHORS

FIELD OF THE INVENTION

The present invention generally relates to photorecording and more particularly to high resolution solid state photorecording.

BACKGROUND OF THE INVENTION

Modern film photography provides both amateurs and professionals with high resolution photographic prints. For example, using a popular 35 millimeter film format, cameras capture scene images on the film, which is subsequently developed into negatives by immersing the film in a sequence of suitable wet chemical baths. Light is projected through the negative onto photosensitive print paper, which is developed into a high resolution photographic print using another sequence of wet chemical baths. Dry, solid state photorecording processes provide advantages since they operate independent of any wet chemical baths.

Various methods of solid state photorecording of a scene are known. One method comprises directly imaging the scene onto a sheet of storage phosphor particles. Such storage phosphors particles have acceptable light sensitivity equivalent to some types of photographic film. Unfortunately, a portion of light of an image incident upon each phosphor particle is scattered to adjacent phosphor particles, degrading resolution of the stored image. Since the storage phosphor particles are relatively large particles, typically in a range five to ten microns in diameter, they scatter more light than some other smaller particles. A minimum particle size is limited because there is an undesirable decrease in luminescent efficiency as storage phosphor particles are made smaller than approximately five microns in diameter.

Image resolution is especially degraded when storing a high contrast image, which includes a very bright region adjacent to a very dark region. Storage phosphors that correspond to the very bright image region scatter a large amount light to adjacent storage phosphors that correspond to the very dark image region. Accordingly, the image recorded by the storage phosphors includes a bright region that has bled over to obscure an adjacent dark region.

Another solid state photorecording method comprises directly imaging the scene onto a Charge Coupled Device (CCD) and storing in a memory device electrical signals produced by the CCD in response to the imaged scene. While simple CCD's having a small number of pixels are easily available at low cost, manufacturing difficulties limit availability and increase cost of complex CCD's having a large number of pixels, such as more than one million pixels.

What is needed is a simplified, cost effective optical apparatus for solid state photorecording of optical images with enhanced resolution.

SUMMARY OF THE INVENTION

The present invention provides a simplified, cost effective optical apparatus for solid state photorecording of optical images with enhanced resolution. The invention avoids the complexity and associated cost of charge coupled device sensors while providing resolution enhancements over previously known phosphor storage technology.

Briefly and in general terms, the optical apparatus of the invention includes an array of optical apertures and a plurality of portions of a phosphorescent material. Each portion is optically coupled to a respective one of the apertures. The apertures are exposed to an optical image so as to record the image in the plurality of portions of the phosphorescent material.

A number of the apertures of the invention is large, preferably within a range of approximately one million to seven million apertures. For example in a preferred embodiment the number of the apertures is approximately six million. Preferably, the optical apertures are microscopic optical apertures. For example, each aperture has a respective width dimension within a range of approximately ten to fifty microns. Preferably, the respective width dimension of each aperture is approximately twelve microns.

In a preferred embodiment the array of optical apertures is disposed on a surface of a substrate. The preferred embodiment further includes a plurality of cavities wherein each cavity extends into the substrate from a respective one of the optical apertures. Each portion of the phosphorescent material is disposed within a respective one of the cavities.

In prior art employing a mere sheet of storage phosphors, a portion of light of an image incident upon each phosphor is scattered to adjacent phosphors, degrading resolution of a stored image. This problem is solved by the present invention since each cavity has a respective cavity wall for substantially preventing any optical transmission therethrough, thereby substantially optically isolating each portion of the phosphorescent material from any light scattered from any other portion of the phosphorescent material. Preferably a surface of the cavity wall is coated with a highly reflective material. In another embodiment the cavity wall includes a light absorbing material.

In the preferred embodiment the cavities comprise shallow pits extending into the surface of the substrate. In an another preferred embodiment the cavities extend entirely through the substrate. Another preferred embodiment includes a plurality of waveguides for substantially optically isolating each portion of the phosphorescent material from any light scattered from any other portion of the phosphorescent material, wherein each waveguide has a respective extremity integrally coupled with a respective one of the apertures.

The preferred embodiment of the invention further includes a light source for exciting the phosphorescent material to emit light representative of the recorded image. A photoelectric sensor is optically coupled with phosphorescent material for generating an electric signal in response to light emitted by the phosphorescent material.

Other aspects and advantages of the present invention will become apparent from the following detailed description, in conjunction with the accompanying drawings, illustrating by way of example the principles of the invention.

DETAILED DESCRIPTION OF PREFERRED EMBODIMENT

Figure 1:
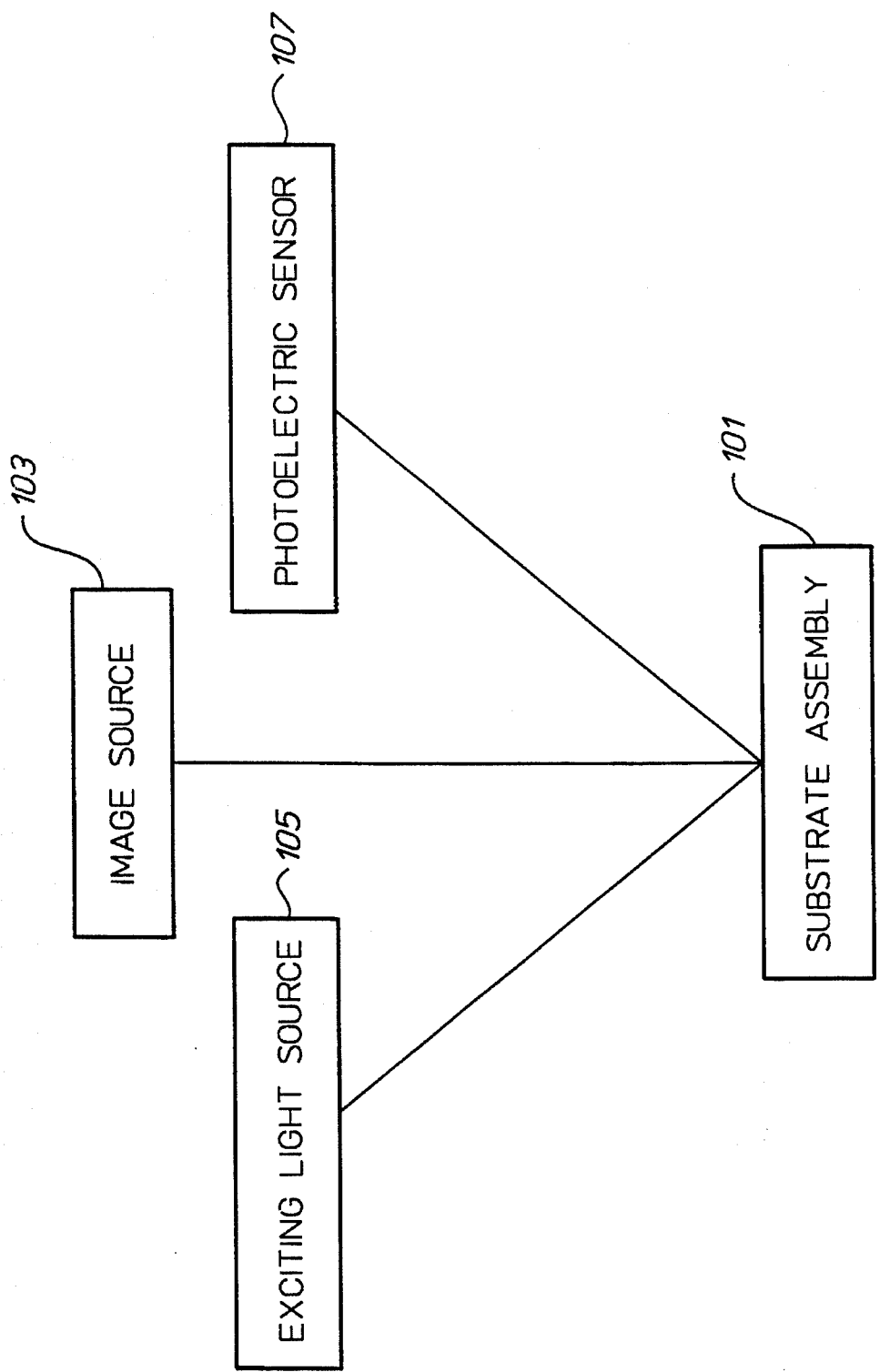
FIG. 1 is a block diagram of a preferred embodiment of the invention.

FIG. 1 is a block diagram of a preferred embodiment of the invention. As shown in the block diagram, the preferred embodiment of the invention includes a substrate assembly 101. The assembly comprises a substrate having a surface wherein an array of optical apertures is disposed on the surface. Additionally, there is a plurality of cavities wherein each cavity extends into the substrate from a respective one of the optical apertures. Furthermore, the assembly includes a plurality of portions of a phosphorescent material wherein each portion is disposed within a respective one of the cavities and is optically coupled with a respective one of the apertures.

As shown in the block diagram, the preferred embodiment further comprises an image source 103 in optical communication with the substrate assembly. The image source exposes the apertures to an optical image so as to record the image in the plurality of portions of the phosphorescent material. Various image sources are known in the art. For example a view camera having a lens is advantageously employed to focus an image of a scene onto the array of apertures.

The preferred embodiment of the invention further includes a light source 105 for exciting the phosphorescent material to emit light representative of the recorded image. A desired wavelength characteristic of the exciting light source is chosen based upon the phosphorescent material. For example, there are numerous desirable phosphorescent materials, such as Europium and Samarium doped Calcium Sulfide, which store a record of exposure to visible light, and which emit visible light representative of the record when excited with light of an infrared wavelength. Alternative suitable phosphors are known, for example those which are discussed in Preparation and Characteristics of Solid Luminescent Materials, especially Chapter 7, by Brian O'Brien, pages 115–371, John Wiley & Sons (1948), which are incorporated by references.

A photoelectric sensor 107, for example a high gain photomultiplier, is optically coupled with the phosphorescent material for generating an electric signal in response to light emitted by the phosphorescent material. Preferably the exciting light source provides a beam or bar of light that is scanned over the apertures, so that at any given time during a scan only a limited number of the phosphor portions are emitting light. Accordingly, at any given time during the scan, full resources of the photoelectric sensor are advantageously concentrated on sensing only the limited number of phosphor portions.

Figure 2:
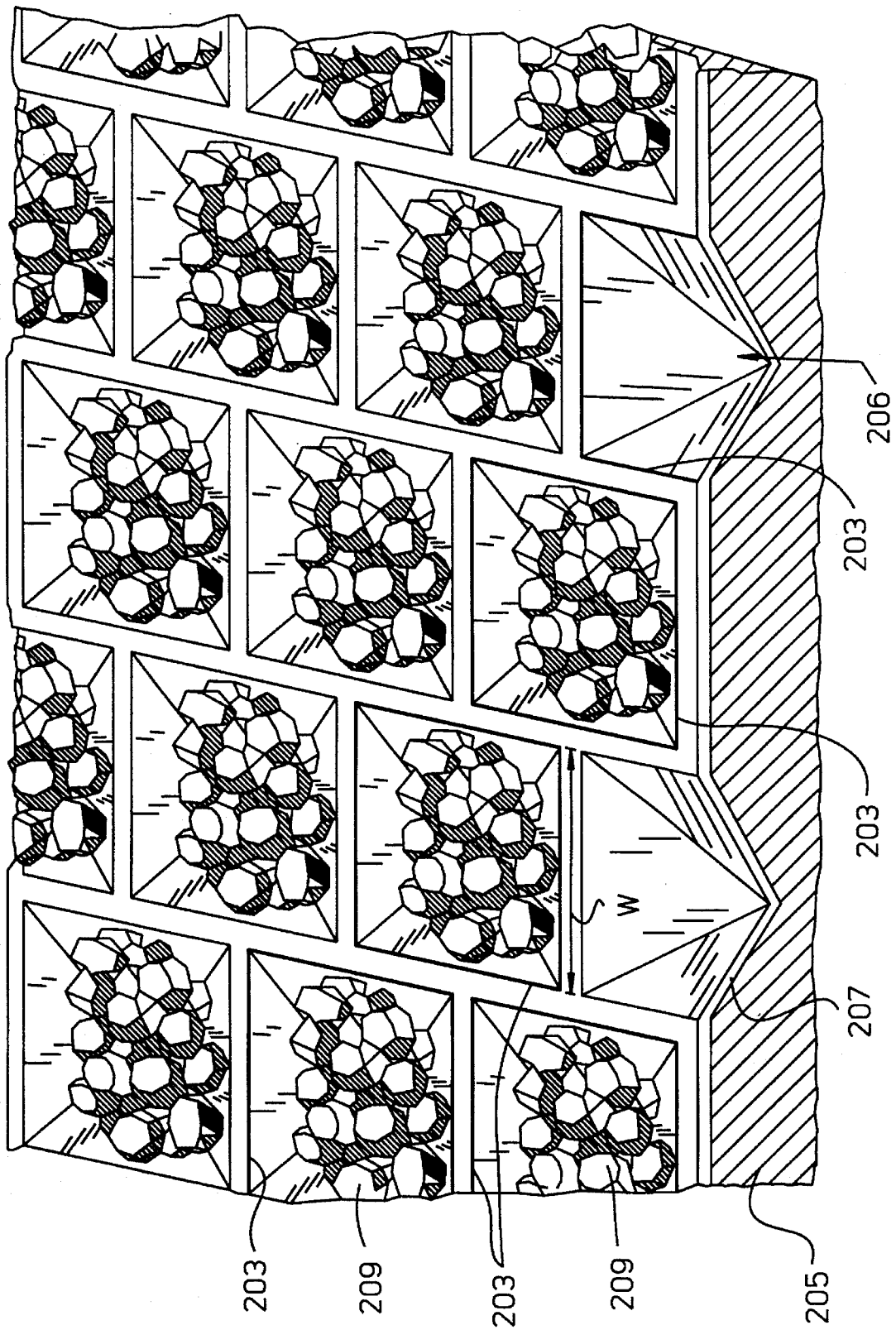
FIG. 2 is a detailed cut away perspective view of a preferred embodiment of a substrate assembly of the block diagram of FIG. 1.

FIG. 2 is a detailed cut away perspective view of a preferred embodiment of the substrate assembly 101 of the block diagram of FIG. 1. As shown, a two dimensional array of optical apertures 203 is disposed on the surface of the substrate 205. A number of the apertures of the invention is large, preferably within a range of approximately one million to seven million apertures. For example in a preferred embodiment the number of the apertures is approximately six million apertures. For sake of simplicity, far fewer apertures are shown in FIG. 2.

Preferably, the optical apertures are microscopic optical apertures. For example, each aperture has a respective width dimension, W, within a range of approximately ten to fifty microns. Preferably, the respective width dimension of each aperture is approximately twelve microns. For best image quality, the apertures of the array are arranged proximate one another, so that each aperture is separated from a respective adjacent aperture by a distance less than the width of any aperture.

As shown, each one of the cavities 206 extends into the substrate from a respective one of the optical apertures. Each portion of the phosphorescent material is disposed within a respective one of the cavities. In the preferred embodiment shown in FIG. 2 the cavities comprise uniform shallow pits extending into the surface of the substrate. For example, using photolithography techniques a silicon substrate is masked and anisotropically etched to produce the uniform shallow pits. An alternative manufacturing method comprises impressing uniform pits into a thermosetting plastic substrate, using techniques similar to those employed in manufacturing audio compact disks.

Each cavity has a respective cavity wall for substantially preventing any optical transmission therethrough, thereby substantially optically isolating each portion of the phosphorescent material from any light scattered from any other portion of the phosphorescent material. Preferably a surface of the cavity wall is coated with a highly reflective material 207. For example, after the cavities are etched into the silicon substrate, a highly reflective metal coating, such as a layer of aluminum, is sputtered onto the substrate. While the highly reflective material is preferred, it should be understood that the invention is not strictly limited to such embodiments since the optical isolation from the scattered light is advantageously provided by other materials and other arrangements of materials. For example, in another embodiment the cavity wall includes a light absorbing material.

As shown in FIG. 2, the assembly includes a plurality of portions of a phosphorescent material wherein each portion is disposed within a respective one of the cavities and is optically coupled with a respective one of the apertures. Preferably phosphor particles are disposed in the cavities by spreading the particles as a dust over the surface of the substrate. A transparent plate, not shown in FIG. 2, is placed on the substrate surface to insure that the phosphors remain in the cavities. Alternatively, a the phosphor particles may be mixed with a suitable binder such polyvinyl alcohol. For illustrative purposes only, two cavities in foreground of FIG. 2 are cut away and are shown without phosphorescent material disposed therein.

As indicated previously herein, the image source exposes the apertures to an optical image so as to record the image in the plurality of portions of the phosphorescent material. In the preferred embodiment shown in FIG. 2, each portion comprises phosphor particles that are relatively large particles, typically in a range five to ten microns in diameter. A minimum particle size is limited because there is an undesirable decrease in luminescent efficiency as phosphor particles are made smaller, for example, smaller than approximately five microns in diameter. In general, particle shapes are not uniform, although for sake of simplicity the phosphor particles are shown as uniform in FIG. 2.

Figure 3:
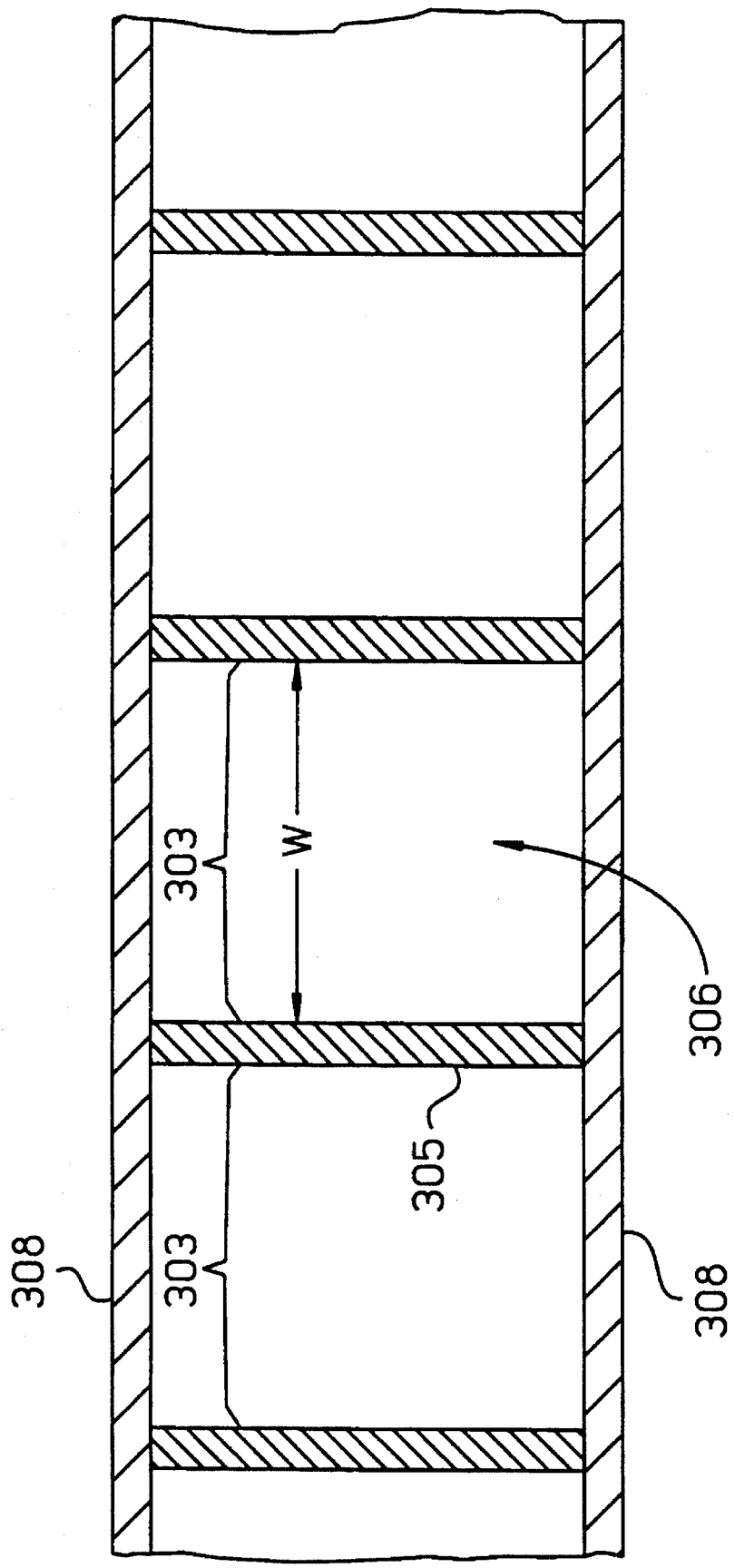
FIG. 3 is a detailed cut away cross sectional view of another preferred embodiment of the substrate assembly of the block diagram of FIG. 1.

FIG. 3 is a detailed cut away cross sectional view of another preferred embodiment of the substrate assembly of the block diagram of FIG. 1. The embodiment shown in FIG. 3 is substantially similar to that shown in FIG. 2 and discussed in detail previously herein. Just as in FIG. 2, each optical aperture 303 of FIG. 3 has a respective width dimension, W. However, in contrast to the cavities comprising shallow pits as shown in FIG. 2, each of the cavities 306 extend from a respective aperture entirely through the substrate 305, as shown in cross section of the substrate in FIG. 3. For example, using photolithography techniques a silicon substrate is masked and anisotropically etched for an extended period of time sufficient to produce the cavities extending entirely through the substrate.

As discussed previously herein with respect to FIG. 2, each cavity shown in FIG. 3 has a respective cavity wall for substantially preventing any optical transmission therethrough, thereby substantially optically isolating each portion of the phosphorescent material from any light scattered from any other portion of the phosphorescent material. Preferably a surface of the cavity wall is coated with a highly reflective material as discussed in detail previously herein with respect to FIG. 2.

A respective portion of phosphorescent material (not shown in FIG. 3) is disposed in each of the cavities. Preferably, a respective sheet 308 of a transparent material for providing additional structural support is laminated onto each of a first surface and an opposing surface of the substrate.

Figure 4:
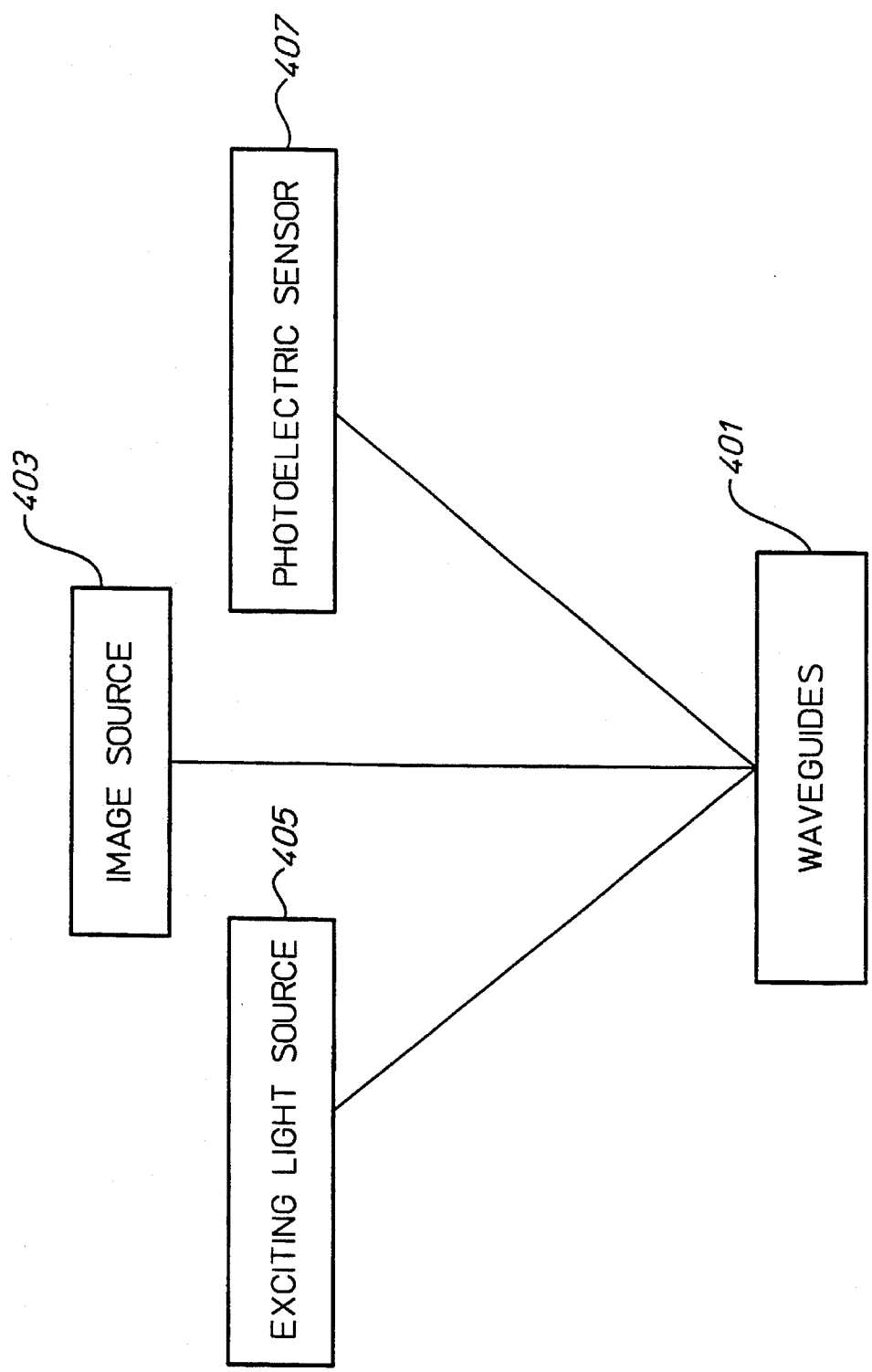
FIG. 4 is a block diagram of another preferred embodiment of the invention.

FIG. 4 is a block diagram of another preferred embodiment of the invention. As shown in the block diagram, this embodiment of the invention includes a plurality of waveguides 401. Each waveguide has a respective extremity integral with a respective optical aperture. The extremities of the waveguides are arranged so as to provide a two dimensional planar array of the optical apertures. To provide advantageous cost savings, it is preferred that each waveguide include an optically transparent plastic polymer. Particles of phosphorescent material are suspended within the plastic of the waveguides. Accordingly, this embodiment includes a plurality of portions of the phosphorescent material wherein each portion is disposed within a respective one of the waveguides and is optically coupled with a respective one of the waveguide optical apertures.

As shown in the block diagram, the preferred embodiment further comprises an image source 403 in optical communication with the waveguides. The image source exposes the apertures to an optical image so as to record the image in the plurality of portions of the phosphorescent material. The waveguides substantially optically isolate each portion of the phosphorescent material from any light scattered from any other portion of the phosphorescent material.

The preferred embodiment of the invention further includes a light source 405 for exciting the phosphorescent material to emit light representative of the recorded image. A photoelectric sensor 407, is optically coupled with phosphorescent material for generating an electric signal in response to light emitted by the phosphorescent material.

Figure 5:
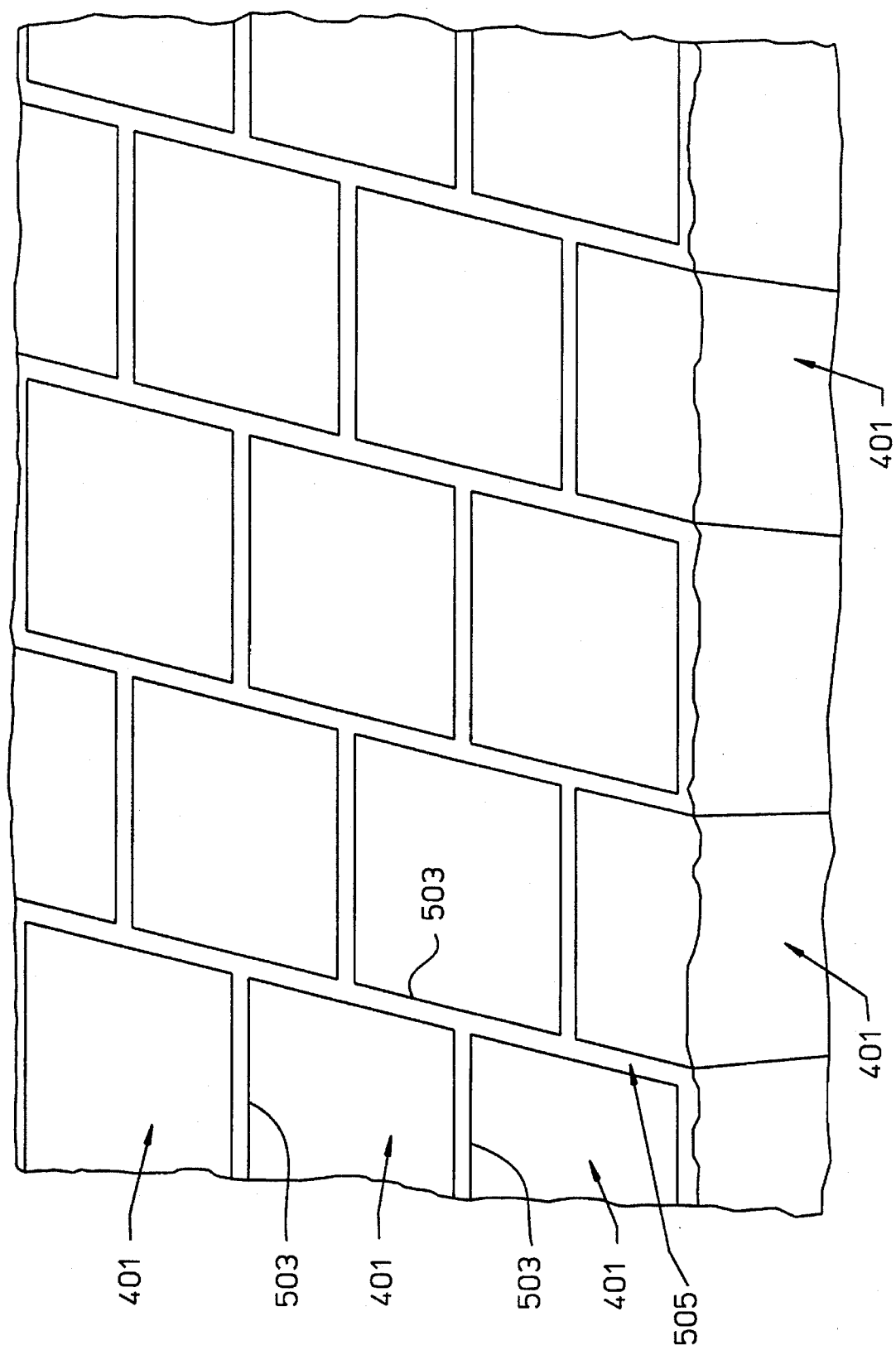
FIG. 5 is a detailed cut away perspective view of optical waveguides of the block diagram of FIG. 4.

FIG. 5 is a detailed cut away perspective view of optical waveguides 401 of the block diagram of FIG. 4. Each waveguide has a respective extremity integral with a respective optical aperture 503. The extremities of the waveguides are arranged so as to provide a two dimensional planar array of the optical apertures. Each waveguide includes a suitable optical material, preferably an optically transparent photocurable plastic polymer.

Particles of phosphorescent material (not shown in FIG. 5) are suspended within the plastic of the waveguides 401. Accordingly, there is a plurality of portions of the phosphorescent material, wherein each portion is disposed within a respective one of the waveguides and is optically coupled with a respective one of the waveguide optical apertures.

Plastic material 505 having a refractive index substantially different than that of the waveguides is disposed between adjacent waveguides. Accordingly, the waveguides substantially optically isolate each portion of the phosphorescent material from any light scattered from any other portion of the phosphorescent material. Using photolithography techniques, optically transparent photo-curable plastic polymer intermixed with phosphor particles is masked and exposed to ultraviolet light to produce the waveguides. The ultraviolet light causes the plastic material of the waveguides to polymerize, thereby substantially increasing refractive index of the plastic material of the waveguides. Since the plastic material 505 disposed between the adjacent waveguides is masked to avoid contact with the ultraviolet light, the plastic material disposed between the adjacent waveguides is not polymerized and has a refractive index substantially lower than that of the waveguides.

The present invention provides a simplified, cost effective optical apparatus for solid state photorecording of optical images with enhanced resolution. Although specific embodiments of the invention have been described and illustrated, the invention is not to be limited to the specific forms or arrangements of parts so describe and illustrated, and various modifications and changes can be made without departing from the scope and spirit of the invention. Within the scope of the appended claims, therefore, the invention may be practiced otherwise than as specifically described and illustrated.

What is claimed is:

1. An optical apparatus comprising:
   an array of optical apertures;
   a plurality of portions of a phosphorescent material that stores a record of exposure to visible light, each portion being optically coupled to a respective one of the apertures; and
   means for exposing the apertures to an optical image of visible light, so as to record the image in the plurality of portions of the phosphorescent material.

2. An apparatus as in claim 1 wherein a number of the apertures is within a range of approximately one million to seven million apertures.

3. An apparatus as in claim 2 wherein the number of the apertures is approximately six million apertures.

4. An apparatus as in claim 1 wherein the optical apertures are microscopic optical apertures.

5. An apparatus as in claim 1 wherein each aperture has a respective width dimension within a range of approximately ten to fifty microns.

6. An apparatus as in claim 5 wherein the respective width dimension of each aperture is approximately twelve microns.

7. An apparatus as in claim 1 further comprising a substrate having a surface wherein the array of optical apertures is disposed on the surface of the substrate.

8. An apparatus as in claim 7 further comprising a plurality of cavities, each cavity extending into the substrate from a respective one of the optical apertures.

9. An apparatus as in claim 8 wherein each portion of the phosphorescent material is disposed within a respective one of the cavities.

10. An apparatus as in claim 9 wherein each cavity incudes a respective cavity wall means for substantially preventing any optical transmission therethrough, thereby substantially optically isolating each portion of the phosphorescent material from any light scattered from any other portion of the phosphorescent material.

11. An apparatus as in claim 10 wherein said cavity wall means includes a highly reflective material.

12. An apparatus as in claim 10 wherein said cavity wall means includes a light absorbing material.

13. An apparatus as in claim 8 wherein the cavities comprise pits extending into the surface of the substrate.

14. An apparatus as in claim 8 wherein the cavities extend entirely through the substrate.

15. An apparatus as in claim 1 further comprising a plurality of waveguide means for substantially optically isolating each portion of the phosphorescent material from any light scattered from any other portion of the phosphorescent material, each waveguide means having an respective extremity integrally coupled with a respective one of the apertures.

16. An apparatus as in claim 1 further comprising a light source for exciting the phosphorescent material to emit light representative of the recorded image.

17. An apparatus as in claim 1 further comprising a means optically coupled with the plurality of apertures for exciting the phosphorescent material to emit light representative of the recorded image.

18. An apparatus as in claim 17 further comprising a photoelectric sensor optically coupled with phosphorescent material for generating an electric signal in response to light emitted by the phosphorescent material.

19. An apparatus as in claim 1 wherein:

each aperture of the array has a respective width dimension; and the apertures are arranged proximate one another, so that each aperture is separated from a respective adjacent aperture by a distance less than the width of any aperture.

* * * * *